(12) United States Patent
Sanders et al.

(10) Patent No.: US 8,717,575 B2
(45) Date of Patent: May 6, 2014

(54) SYSTEMS AND METHODS FOR ENVIRONMENTALLY INSENSITIVE HIGH-PERFORMANCE FIBER-OPTIC GYROSCOPES

(75) Inventors: Steven J. Sanders, Scottsdale, AZ (US); Jeffrey E. Lewis, Phoenix, AZ (US); Sorin Mosor, Peoria, AZ (US); David A. Doheny, Clearwater, FL (US); Norman Gerard Tarleton, Glendale, AZ (US); Austin Taranta, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 435 days.

(21) Appl. No.: 13/211,658

(22) Filed: Aug. 17, 2011

(65) Prior Publication Data

US 2013/0044328 A1    Feb. 21, 2013

(51) Int. Cl.
    *G01C 19/72*    (2006.01)
(52) U.S. Cl.
    USPC .......................................................... 356/464
(58) Field of Classification Search
    USPC .......................................................... 356/464
    See application file for complete search history.

(56) References Cited

U.S. PATENT DOCUMENTS

| | | | |
|---|---|---|---|
| 4,948,252 A | 8/1990 | Cekorich | |
| 5,090,809 A | 2/1992 | Ferrar | |
| 5,170,225 A | 12/1992 | Ferrar | |
| 5,184,195 A | 2/1993 | Goldner | |
| 5,289,258 A | 2/1994 | Szafraniec | |
| 5,321,503 A | 6/1994 | Bramson | |
| 5,363,195 A | 11/1994 | Ward | |
| 5,381,230 A * | 1/1995 | Blake et al. | ................ 356/460 |
| 5,384,637 A | 1/1995 | Sanders | |
| 5,412,472 A | 5/1995 | Okada | |
| 5,420,684 A | 5/1995 | Carroll | |
| 5,457,532 A | 10/1995 | August | |

(Continued)

FOREIGN PATENT DOCUMENTS

| | | |
|---|---|---|
| EP | 1790944 | 5/2007 |
| WO | 9858234 | 12/1998 |

OTHER PUBLICATIONS

Bortz, "Annealed Proton-Exchanfed LiNbO3 Waveguides", "Optic Letters", Dec. 1, 1991, pp. 1844-1846, vol. 16, No. 23, Publisher: Optical Society of America.

(Continued)

*Primary Examiner* — Tarifur Chowdhury
*Assistant Examiner* — Jonathon Cook
(74) *Attorney, Agent, or Firm* — Fogg & Powers LLC

(57) ABSTRACT

Systems and methods for environmentally insensitive high-performance fiber-optic gyroscopes are provided. In one embodiment, a loop closure electronics apparatus for a fiber optic gyroscope having an optical phase modulator characterized by a transfer function that includes an error component of at least second order is provided. The apparatus comprises: a first digital circuit that generates a digital bias modulation signal; a second digital circuit that generates a digital feedback signal; at least one digital-to-analog converter that produces an electrical signal that drives the phase modulator from the digital bias modulation signal and the digital feedback signal; and a compensator that includes an analog filter of at least second order and a digital filter of at least second order, wherein the analog filter and the digital filter pre-filter the electrical signal to compensate for the error component.

20 Claims, 3 Drawing Sheets

(56) References Cited

U.S. PATENT DOCUMENTS

| | | |
|---|---|---|
| 5,459,575 A | 10/1995 | Malvern |
| 5,469,257 A * | 11/1995 | Blake et al. .................. 356/464 |
| 5,530,545 A | 6/1996 | Pavlath |
| 5,682,241 A | 10/1997 | Mark |
| 5,719,674 A | 2/1998 | Martin |
| 5,734,469 A | 3/1998 | Strandjord |
| 5,781,300 A | 7/1998 | Strandjord |
| 5,914,781 A | 6/1999 | Jaklitsch |
| 5,923,424 A | 7/1999 | Sanders |
| 5,926,275 A | 7/1999 | Sanders |
| 5,946,097 A | 8/1999 | Sanders |
| 5,953,123 A | 9/1999 | Jaklitsch |
| 5,999,304 A | 12/1999 | Sanders |
| 6,028,668 A | 2/2000 | Rider |
| 6,046,810 A | 4/2000 | Sanders |
| 6,351,310 B1 | 2/2002 | Emge |
| 6,469,792 B1 | 10/2002 | Arnn |
| 6,473,182 B1 | 10/2002 | Tazartes |
| 6,556,509 B1 | 4/2003 | Cekorich |
| 6,563,589 B1 | 5/2003 | Bennett |
| 6,744,519 B2 | 6/2004 | Lange et al. |
| 6,765,678 B2 | 7/2004 | Strandjord |
| 7,034,946 B2 | 4/2006 | Chen |
| 7,038,783 B2 | 5/2006 | Standjord |
| 7,333,209 B2 | 2/2008 | Greening |
| 7,336,364 B2 | 2/2008 | Greening |
| 7,777,889 B2 | 8/2010 | Qiu |
| 7,817,284 B2 | 10/2010 | Ward |
| 7,872,758 B2 | 1/2011 | Ward |
| 2001/0030752 A1 | 10/2001 | Scruggs |
| 2003/0128365 A1 | 7/2003 | Strandjord |
| 2007/0103691 A1 | 5/2007 | Greening |
| 2007/0121116 A1 | 5/2007 | Greening |
| 2008/0079946 A1 | 4/2008 | Greening |
| 2009/0201510 A1 * | 8/2009 | Ward et al. .................. 356/460 |
| 2009/0219545 A1 | 9/2009 | Feth |

OTHER PUBLICATIONS

Pavlath, "Fiber Optic Gyro Evolution Concept to Product", Aug. 10, 1992, pp. 575-586, Publisher: American Institute of Aeronautics and Astronautics, Inc.

"Optical Interferometers for Sensing Electromagnetic Fields", Mar. 29, 1991, pp. 1-97, Publisher: SRICO.

* cited by examiner

SYSTEMS AND METHODS FOR ENVIRONMENTALLY INSENSITIVE HIGH-PERFORMANCE FIBER-OPTIC GYROSCOPES

BACKGROUND

The function of an optical modulator is to transduce an electronic modulation signal received from an electrical circuit into phase modulation of a light beam traversing through a waveguide. For high performance optical modulators, Annealed Proton Exchanged (APE) Lithium Niobate (LiNbO) material is typically used for fabrication of the waveguide and phase modulator. Electrodes embedded within the APE Lithium Niobate are connected to an electrical circuit that provides a modulation signal. Modulation is accomplished by varying an electric field across a portion of the waveguide. This varying electric field causes variations in the index of refraction for that portion of the waveguide, imparting a phase shift to the light beam. APE Lithium Niobate is widely used for optical phase modulators across several optical technology fields, such as communications and fiber optic gyroscopes, because it displays a desirable frequency response across a wide range of operating frequencies. That is, the gain of the modulator (i.e., the amplitude and phase shift of its output) is fairly flat (i.e., constant) over a wide frequency range of input signals.

A problem exists, however, when attempting to use APE Lithium Niobate for low frequency applications, especially where the optical modulator is exposed to high temperature or near vacuum or other desiccating environments. Under such conditions, the gain of the modulator for low frequency signals starts to diminish or otherwise vary from the high-frequency gain. The longer the modulator is exposed to vacuum, the more the degradations will continue to spread upward and affect higher frequencies. For communications applications, where signals are typically in the hundreds of megahertz, degradation of modulator performance at lower frequencies may not adversely affect performance. However, for navigation gyroscope applications that measure rotations starting in the sub-hertz range, such changes in the frequency response can render the gyroscope unacceptable for performing precise navigation functions.

For the reasons stated above and for other reasons stated below which will become apparent to those skilled in the art upon reading and understanding the specification, there is a need in the art for systems and methods for environmentally insensitive high-performance fiber-optic gyroscopes.

SUMMARY

The Embodiments of the present invention provide methods and systems for environmentally insensitive high-performance fiber-optic gyroscopes and will be understood by reading and studying the following specification.

A loop closure electronics apparatus for a fiber optic gyroscope having an optical phase modulator characterized by a transfer function that includes an error component of at least second order, the apparatus comprising: a first digital circuit that generates a digital bias modulation signal; a second digital circuit that generates a digital feedback signal; at least one digital-to-analog converter that produces an electrical signal that drives the phase modulator from the digital bias modulation signal and the digital feedback signal; and a compensator that includes an analog filter of at least second order and a digital filter of at least second order, wherein the analog filter and the digital filter pre-filter the electrical signal to compensate for the error component.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention address the need for environmentally insensitive high-performance fiber-optic gyroscopes by providing for a gyroscope that uses an optical phase modulator fabricated from a material having a stable frequency response in both vacuum and high-temperature environments. Although this material is typically characterized by a gain transfer function that is acceptably flat over a portion of the frequency range applicable to gyroscope navigation applications, second- and higher-order errors are often present over a second portion of the gain curve. These higher-order errors can limit the performance of the modulator in navigation-grade gyroscopes. The present application further presents loop closure electronics tuned to compensate for the second- and higher-order error components. The combination provides an overall gyroscope frequency response that is stable under vacuum and with sufficient sensitivity and accuracy for precision navigation.

Figure 1:
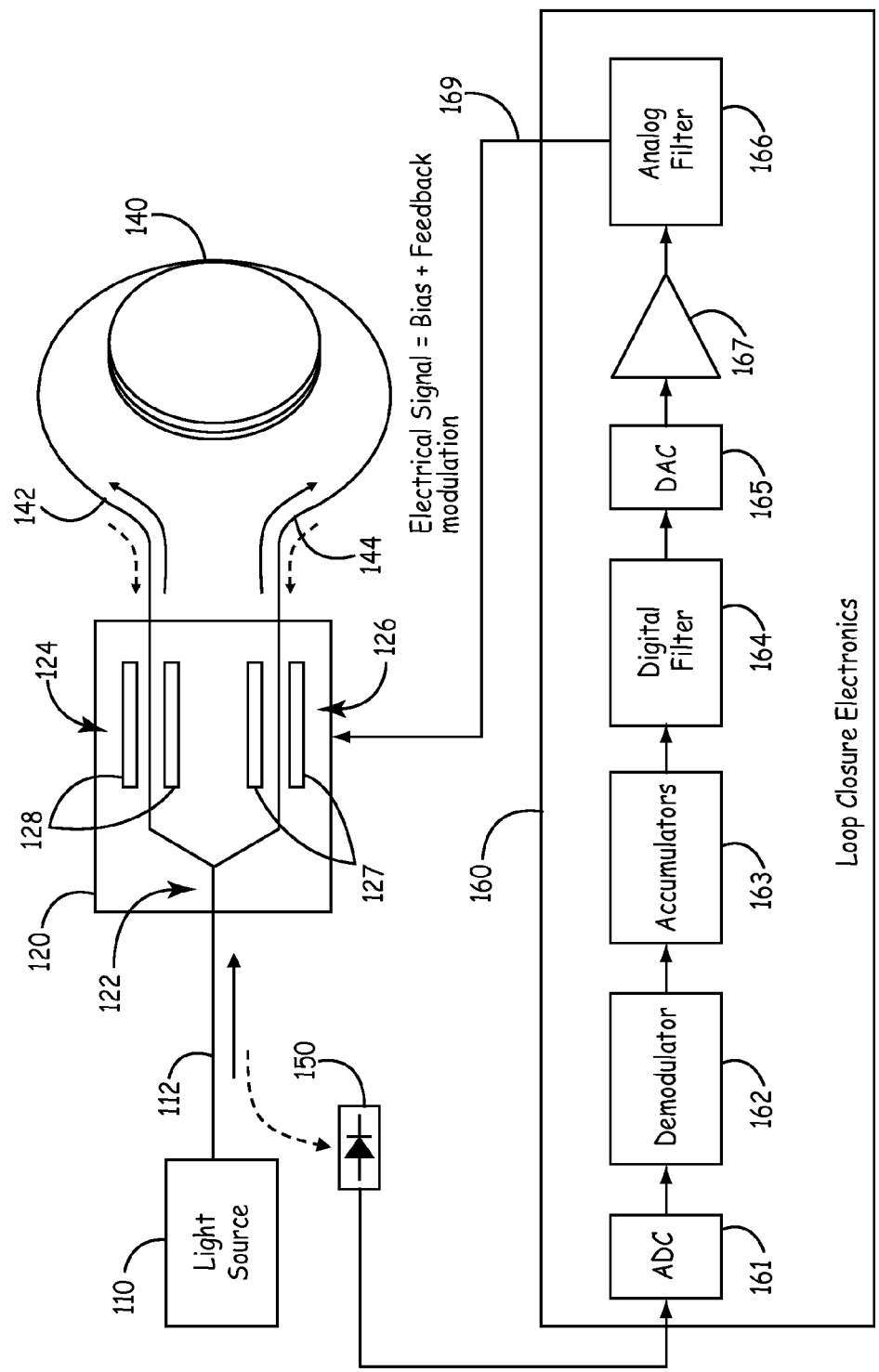
FIG. 1 is a block diagram of a gyroscope of one embodiment of the present invention.

FIG. 1 is a block diagram of a fiber optic gyroscope 100 of one embodiment of the present invention. Gyroscope 100 comprises a light source 110, an integrated optical circuit 120 and a fiber coil 140. Light source 110 is coupled to integrated optical circuit 120 via an optical media 112. Integrated optical circuit 120 is in turn coupled to both a first lead 142 at one end of fiber coil 140 and a second lead 144 at the opposite end of fiber coil 140.

Integrated optical circuit 120 include a "Y-junction" 122 which functions as both an optical splitter for a light beam received from light source 110 and an optical combiner for light beams returning from fiber coil 140. In operation, a light beam received from light source 110 is split by Y-junction 122 into a first beam which is provided to the first lead 142 of fiber coil 140 and a second beam which is provided to the second lead 144 of fiber coil 140. As such, the first and second light beams are counter-propagating beams travelling in opposite directions through the fiber of coil 140.

After the counter-propagating light beams traverse the length of coil 140, they are recombined at Y junction 122 of the integrated optical circuit 120. The returning recombined light beam is detected by a photodetector 150 coupled to optical media 112. The rotation rate of the coil 140 is determined based on optical characteristics of the light received at the photo detector 150 from interference caused by the Sagnac effect. That is, at photo detector 150, the two returning beams interfere with each other to a degree that is determined by the phase difference between the returning beams. Accordingly, the output produced by photodetector 150 will represent that phase difference. Due to the Sagnac effect, the phase shift measured by photodetector 150 will be a function of the rotation rate of the coil 140.

Because the rotation rates in navigation application can be very small (much less than 1 deg/hour, for example), the phase shift that needs to be measured is also very small. To ensure that the electrical signal produced by photodetector 150 is generated in a range that does not require measurements of a near-zero electrical signal, integrated optical circuit 120 further includes a first optical phase modulator 124 and a second optical phase modulator 126 to phase modulate the counter-propagating light beams traveling through coil 140. For example, in one embodiment, the modulators 124 and 126 will impart an alternating±45 degree phase shift between the two counter-propagating light beams. In that case, when there is no rotation of coil 140, photodetector 150 will generate a non-zero voltage signal indicative of the alternating±45 degree phase shift. Small deviations, which would indicate the presence of some small degree of rotation, from that ±45 degree voltage bias point are easier to measure than small deviations from a zero voltage point.

The 45 degree phase shift bias produced by modulators 124 and 126 is controlled by a bias modulation signal produced by loop closure electronics 160. The bias modulation signal applies an electrical waveform to the electrodes 127 and 128 of the optical modulators 124 and 126. The electrical field from electrodes 127 and 128 alters the index of refraction of the waveguide paths though integrated optical circuit 120 that couple Y-junction 122 to leads 142 and 144 of coil 140.

Instead of using the output of photodetector 150 directly for an open-loop measurement of rotation rate, a more accurate and precise measurement is obtained by closing the loop so that the electrical signal from photodetector 150 provides an input to loop closure electronics 160. In addition to the bias modulation signal, loop closure electronics 160 also produces a feedback waveform to the optical modulators 124 and 126 which attempts to null any phase shift measured at photodetector 150 in excess of the bias phase shift (e.g. 45 degrees). That is, the feedback signal level necessary to maintain to total phase shift locked at ±45 degrees is proportional to the phase shift between the two beams caused by coil rotation. The feedback signal is then the measurement of rotation. The bias modulation signal and feedback signal are combined into the electrical signal 169 that drives the optical modulation of the counter-propagating light beams. In one embodiment, the feedback signal further includes random step signals. As would be appreciated by those of ordinary skill in the art upon studying this specification, application of a standard feedback signal may result in the gyroscope exhibiting a deadband where low, but non-zero rotation appears as a zero rotation rate. In one embodiment, a deadband is prevented by the insertion of the random steps or other modulation waveform into the feedback signal.

As discussed above, the frequency response of optical modulators formed from APE Lithium Niobate will degrade when exposed to vacuum. The degradation typically starts manifesting at a lower frequency range and then spreads to progressively higher frequency ranges over time. Embodiments of the present invention take the novel and non-obvious approach of providing a gyroscope of using Titanium (Ti) in-diffused Lithium Niobate material to form the optical waveguide paths through optical modulators 124 and 126 of integrated optical circuit 120 instead of APE Lithium Niobate. Using Titanium in-diffused Lithium Niobate is a non-obvious choice for fabricating integrated optical circuit 120 because, unlike APE Lithium Niobate, Titanium in-diffused Lithium Niobate is a non-polarizing material. Further, at least under standard atmospheric conditions, Titanium in-diffused Lithium Niobate modulators have a higher-order, more complex, frequency response that is less flat as compared to APE Lithium Niobate. For that reason, it is traditionally considered unsuitable for precision navigation applications. In other words, Ti in-diffused Lithium Niobate is less faithful in translating the bias and feedback electrical modulation signals into a corresponding phase shift in the counter-propagating light beams. As will be discussed below, those errors in translating electrical signals into corresponding optical phase shift can be characterized by a second- or higher-order error component found within the transfer function of the Ti in-diffused Lithium Niobate modulator. One advantage appreciated by the inventors of the present application is that Titanium in-diffused Lithium Niobate optical phase modulators do not exhibit sensitivity to operating in vacuum environments. That is, the frequency response of a Titanium in-diffused Lithium Niobate optical phase modulators do not change over time when operated in a vacuum.

Embodiments of the present invention take advantage of the stable frequency response characteristics of a Ti in-diffused Lithium Niobate optical phase modulator by compensating for the second- or higher-order error component of its frequency response at the system level rather than the component level. In other words, the frequency response of the entire closed loop system of gyroscope 100 is designed to cancel the undesirable frequency response characteristics produced by the use of Titanium in-diffused Lithium Niobate modulators, or other optical modulators having error components that extend past the second order. The frequency response of the gyroscope 100 as a closed loop system is dependent not only on the frequency response of the integrated optical circuit 120, but also the transfer functions of components within the loop closure electronics 160. Because loop closure electronics 160 produces the electrical signal 169 that drives optical modulators 124 and 126, by understanding how the second order error component of Titanium in-diffused Lithium Niobate distorts that signal, loop closure electronics 160 can pre-distort the electrical signal 169 accordingly such that optical modulators 124 and 126 produce the desired optical phase modulation onto the light beams.

Pre-distortion of the electrical waveforms driving optical modulators 124 and 126 is accomplished in the embodiment of FIG. 1 by a combination of an analog filter 166 and digital filter 164 within loop closure electronics 160. The loop closure electronics 160 shown in FIG. 1 provides a simplified block diagram of an electrical circuit used for driving optical modulators 124 and 126 and producing a rate measurement signal.

In the embodiment of FIG. 1, loop closure electronics 160 comprises an analog to digital converter (ADC) 161 which captures digital samples of the electrical signal produced by photodetector 150. One or more demodulators 162 and accumulators 163 extract rotational rate information from the digital samples as well as produce digital modulation data samples used for creating the analog bias and feedback modulation signals that drive optical phase modulators 124 and 126. In the embodiment of FIG. 1, the digital sample data is fed through digital filter 164 prior to conversion to analog by digital-to-analog converter (DAC) 165. The resulting analog electrical waveform is gain amplified by amplifier 167 and fed through analog filter 166 prior to driving optical modulators 124 and 126.

Figure 2:
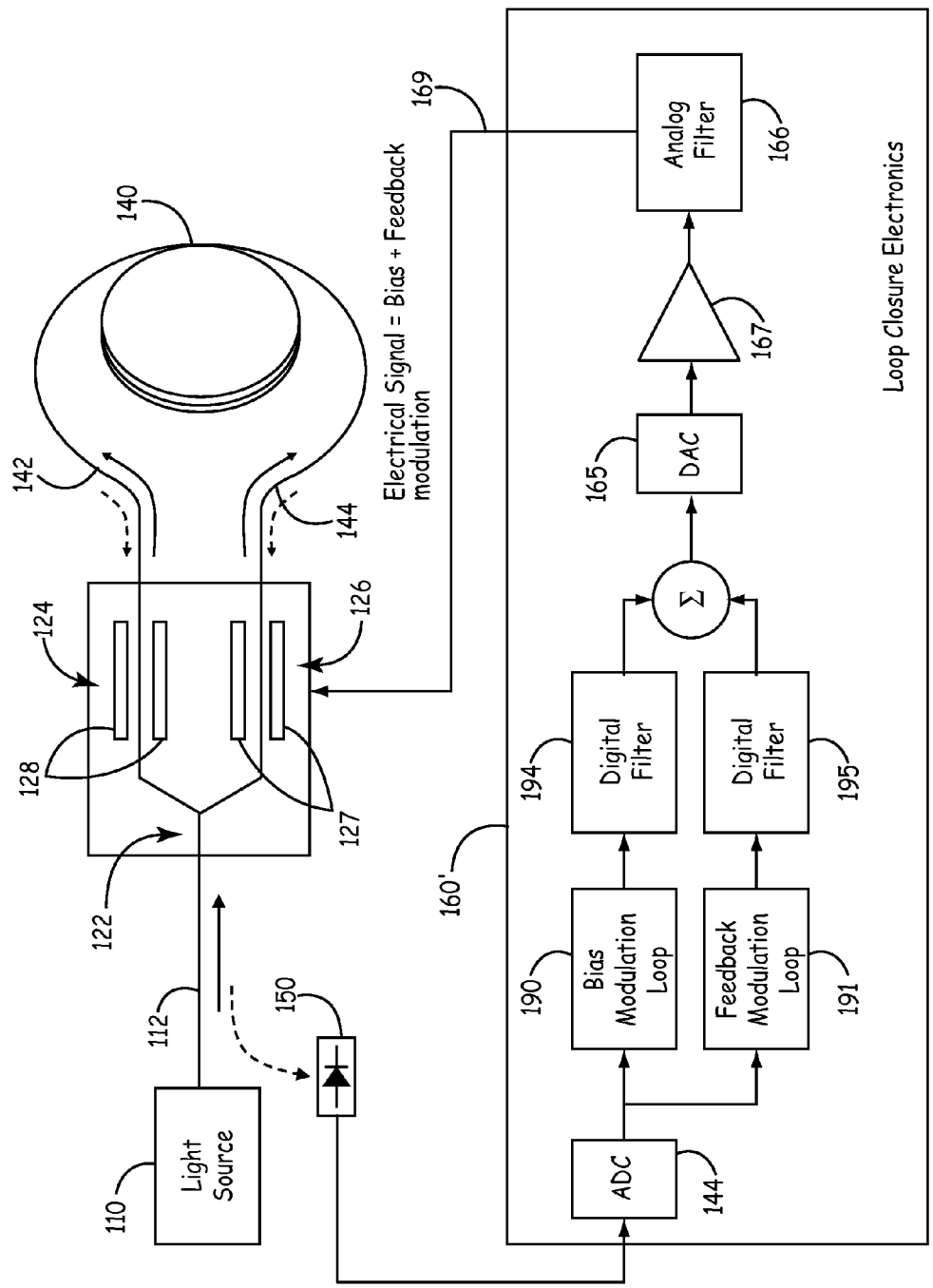
FIG. 2 is a block diagram of a gyroscope of one embodiment of the present invention.

In alternate embodiments, loop closure electronics 160 will internally comprise separate loops or circuits each generating a different component of what will form the analog electrical signal waveform. For example, as illustrated in FIG. 2, for one implementation, loop closure electronics 160' includes a first internal digital circuit 190 that generates digital data for bias modulation while a second digital circuit 191 generates digital data for feedback modulation. Each set of digital data is summed and converted to the analog domain DAC 165 to produce an analog electrical waveform. In that case, digital filters 194 and 195 are included within loops 190 and 191 respectively. The teachings discussed herein with respect to digital filter 164 would apply accordingly to digital filters 194 and 195.

Analog filter 166 and digital filter 164 are each filters of at least the second order. As such, these filters together provide at least 4 poles and 4 zeros (which can be real, complex, or a combination of real and complex) into the system response to compensate for the undesirable frequency response characteristics of using Titanium in-diffused Lithium Niobate. In one embodiment, the filter poles and zeros provided by analog filter 166 and digital filter 164 are designed to compensate for the second- or higher-order Lithium Niobate error components by canceling the poles and zeros of the error components. That is poles of the filters are used to cancel out the effect of zeros of the second- or higher-order error components, while zeros of the filters are used to cancel out the effect of poles of the second- or higher-order error components.

As would be appreciated by one of ordinary skill in the art upon reading this specification, analog filters are fabricated from components having discrete values (such as resistors and capacitors). For this reason, an analog filter permits only a relatively course placement of poles and zeros into a frequency response. Using digital hardware, poles and zero can be placed with high precision by specifying desired coefficients of a digital filter's difference equation. Further, a digital filter can be updated after deployment by uploading a new set of those coefficients to the filter. However, as the order of a digital filter increases, the complexity of implementing the filter increases, requiring more of the hardware's resources. The processing resources on the digital hardware used to implement loop closure electronics 160 is often a factor that limits the order filters that can be executed within gyroscope 100. By using both analog and digital components to place the compensating poles and zeros, embodiments of the present invention provide means for post deployment modifications and accurate pole and zero placement without placing an unnecessary draw on the loop closure electronics 160 processing resources.

In one implementation, analog filter 166 and digital filter 164 are each 2-pole/2-zero filters, providing a total of 4 poles and 4 zeros into the system response. As mentioned above, these poles and zeros are placed to compensate for the undesirable frequency response characteristics introduced by second- or higher-order error components of Lithium Niobate. Accordingly, to determine pole/zero placement the response characteristics of integrated optical circuit 120 is characterized to identify the poles and zeros of the Lithium Niobate error components that distort phase modulation and prevent integrated optical circuit 120 from having a flat frequency response. This particular set of poles and zeros are referred to herein as the error poles and zeros. The combination of analog and digital filters 166 and 164 are designed to cancel the error poles and zeros by placing poles from the filters as much a possible onto the error zeros, and by placing zeros of the filters as much as possible on top of the error poles. In one implementation, the analog filter 166 provides for course placement. Once the 2 or more poles and 2 or more zeros of the analog filter 166 are placed, the 2 or more poles and 2 or more zeros of the digital filter 164 are fine tuned to smooth the overall frequency response of the gyroscope 100. As mentioned above, in alternative embodiments, the poles and zeros of filters 164 and 166 can be placed to address modulators having error corrections past the second order.

Figure 3:
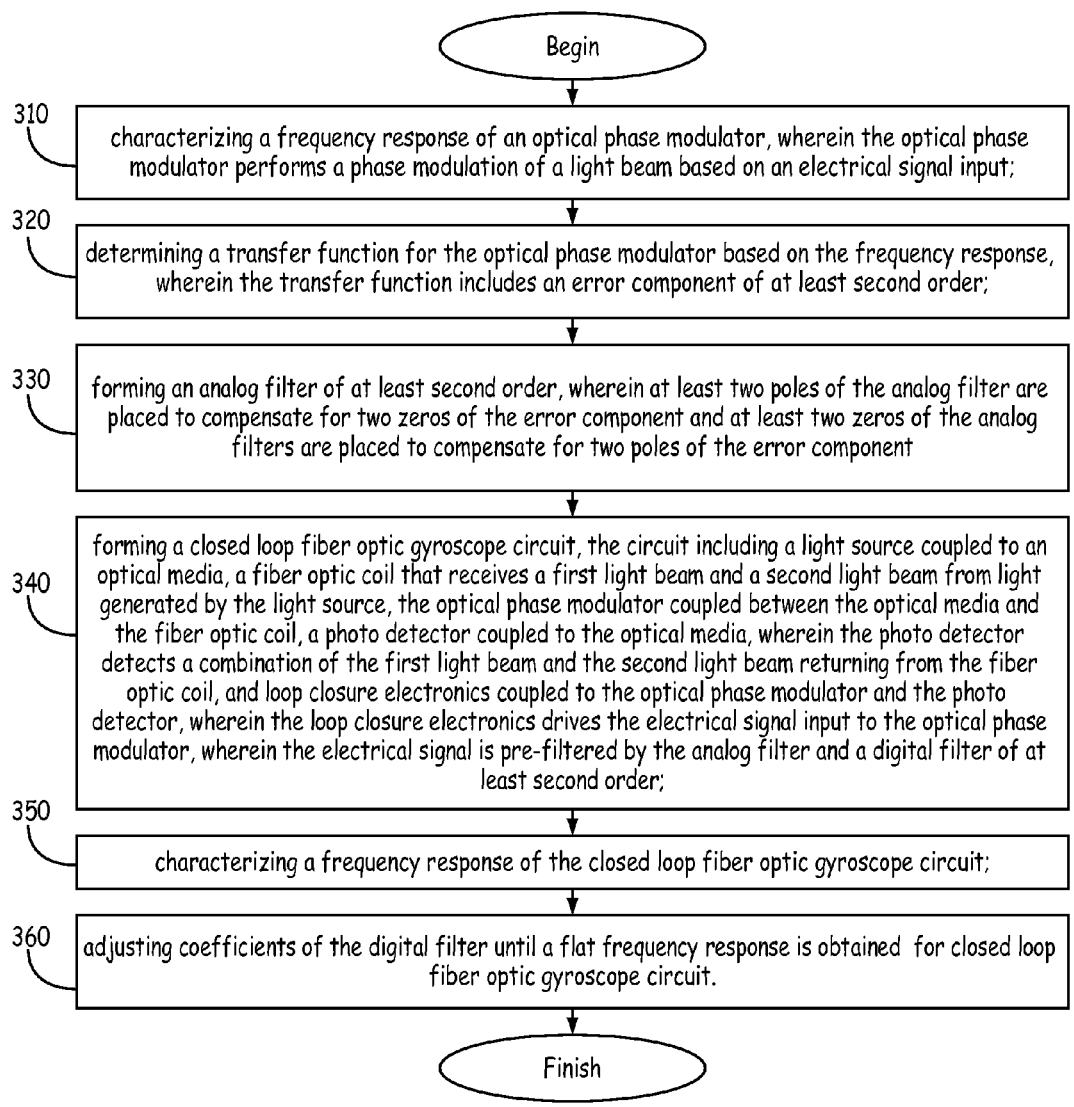
FIG. 3 is a flow chart of a method of one embodiment of the present invention.

FIG. 3 illustrates a method for providing compensation filters for a gyroscope utilizing Titanium in-diffused LiNiNbo3 optical phase modulators of one embodiment of the present invention. The method depicted by FIG. 3, in at least one implementation, is performed using components described above with respect to FIGS. 1 and 2. As such, the teaching and alternate embodiments and implementations described above can be combined with those of the method of FIG. 3 and vice versa.

The method begins at 310 with characterizing a frequency response of an optical phase modulator, wherein the optical phase modulator performs a phase modulation of a light beam based on an electrical signal input. In one embodiment, this is accomplished by sweeping the frequency of an electrical signal driving the optical phase modulator while measuring the phase shift produced by the modulator on a light beam.

The method proceeds to 320 with determining a transfer function for the optical phase modulator based on the frequency response, wherein the transfer function includes an error component of at least second order. In one embodiment, determining a transfer function comprises determining coefficients of polynomials and/or difference equations that approximate the transfer function. Alternately, the transfer function can be approximately determined in terms of poles and zeros.

The method proceeds to 330 with forming an analog filter of at least second order, wherein at least two poles of the analog filter are placed to compensate for two zeros of the second order error component and at least two zeros of the analog filter are placed to compensate for two poles of the second order error component. As discussed above, an analog filter has the advantage of not using up processing resources or gates of the electronics (e.g. Field Programmable Gate Array (FPGA) or Application Specific Integrated Circuit (ASIC)) used for the loop closure electronics. However, the discrete components used to realize the filter will permit placement of poles and zeros with only a relatively course precision such that the error poles and zeros may not be completely canceled. Accordingly, the method next addresses placement of the poles and zeros for a digital filter to fine tune the overall frequency response to more completely compensate for the second order error component.

The method proceeds to 340 with forming a closed loop fiber optic gyroscope circuit, the circuit including a light source coupled to an optical media, a fiber optic coil that receives a first light beam and a second light beam from light generated by the light source, the optical phase modulator coupled between the optical media and the fiber optic coil, a photo detector coupled to the optical media, wherein the photo detector detects a combination of the first light beam and the second light beam returning from the fiber optic coil, and loop closure electronics coupled to the optical phase modulator and the photo detector, wherein the loop closure electronics drives the electrical signal input to the optical phase modulator, wherein the electrical signal is pre-filtered by the analog filter and a digital filter of at least second order. This closed loop fiber optic gyroscope circuit may be realized, for example, by either an actual fiber optic gyroscope device, or a test apparatus that otherwise mimics operation of an actual fiber optic gyroscope device.

In some cases, entire families of Lithium Niobate modulators may perform with similar (though not identical) frequency response so that a single characterization of the family is sufficient in step 310. This would obviate the need for testing all but one or a few modulators, and in that case for the majority of modulators one would proceed to steps 320 and beyond for fine-tuning That is, the step 310 could be accomplished by considering a previously obtained single characterization of the family.

The method proceeds to 350 with characterizing a frequency response of the closed loop fiber optic gyroscope circuit and to 360 with adjusting coefficients of the digital filter until a flat frequency response is obtained for closed loop fiber optic gyroscope circuit. This can be performed, for example, by measuring the step response of the gyroscope as the inferred rotation error response produced by a step voltage waveform applied to the modulator.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A fiber optic gyroscope comprising:
    a light source coupled to an optical media;
    a fiber optic coil that receives a first light beam and a second light beam from light generated by the light source;
    an optical phase modulator coupled between the optical media and the fiber optic coil, wherein the optical phase modulator performs a phase modulation on the first light beam and the second light beam based on an electrical signal, wherein the phase modulation is related to the electrical signal by a transfer function that includes an error component of at least second order;
    a photo detector coupled to the optical media, wherein the photo detector detects a combination of the first light beam and the second light beam returning from the fiber optic coil; and
    loop closure electronics coupled to the optical phase modulator and the photo detector, wherein the loop closure electronics produces and outputs the electrical signal to the optical phase modulator, the loop closure electronics including an analog filter of at least second order and a digital filter of at least second order, wherein the analog filter and the digital filter compensate for the error component.

2. The fiber optic gyroscope of claim 1, wherein the electrical signal is pre-filtered by the analog filter and the digital filter based on a reciprocal of the error component.

3. The fiber optic gyroscope of claim 1, wherein at least two poles of the analog filter are placed to compensate for two zeros of the error component and at least two zeros of the analog filter are placed to compensate for two poles of the error component.

4. The fiber optic gyroscope of claim 3, wherein at least two poles of the digital filter are placed to fine tune the at least two poles of the analog filter and at least two zeros of the digital filter are placed to fine tune the at least two zeros of the analog filter.

5. The fiber optic gyroscope of claim 3, wherein at least two poles of the digital filter are placed to compensate for two zeros of the error component and at least two zeros of the digital filter are placed to compensate for two poles of the error component.

6. The fiber optic gyroscope of claim 1, wherein the optical phase modulator comprises a waveguide further comprised of Titanium in-diffused Lithium Niobate material.

7. The fiber optic gyroscope of claim 1, wherein the loop closure electronics includes a digital-to-analog converter that converts digital samples into the electronic signal, wherein the digital filter is applied to the digital samples prior to the digital-to-analog converter and the analog filter is applied to the electronic signal after the digital-to-analog converter.

8. The fiber optic gyroscope of claim 1, wherein the electronic signal includes a bias modulation signal and a feedback signal.

9. The fiber optic gyroscope of claim 8, wherein the loop closure electronics further inserts random step signals into the electronics signal.

10. A method for a fiber optic gyroscope, the method comprising:
    characterizing a frequency response of an optical phase modulator, wherein the optical phase modulator performs a phase modulation of a light beam based on an electrical signal input;
    determining a transfer function for the optical phase modulator based on the frequency response, wherein the transfer function includes an error component of at least second order;
    forming an analog filter of at least second order, wherein at least two poles of the analog filter are placed to compensate for two zeros of the error component and at least two zeros of the analog filter are placed to compensate for two poles of the error component;
    forming a closed loop fiber optic gyroscope circuit, the circuit including a light source coupled to an optical media, a fiber optic coil that receives a first light beam and a second light beam from light generated by the light source, the optical phase modulator coupled between the optical media and the fiber optic coil, a photo detector coupled to the optical media, wherein the photo detector detects a combination of the first light beam and the second light beam returning from the fiber optic coil, and loop closure electronics coupled to the optical phase modulator and the photo detector, wherein the loop closure electronics drives the electrical signal input to the optical phase modulator, wherein the electrical signal is pre-filtered by the analog filter and a digital filter of at least second order;
    characterizing a frequency response of the closed loop fiber optic gyroscope circuit; and
    adjusting coefficients of the digital filter until a flat frequency response is obtained for closed loop fiber optic gyroscope circuit.

11. The method of claim 10, wherein at least two poles of the digital filter are placed to fine tune the at least two poles of the analog filter and at least two zeros of the digital filter are placed to fine tune the at least two zeros of the analog filter.

12. The method of claim 10, wherein the optical phase modulator comprises a waveguide further comprised of titanium in-diffused Lithium Niobate material.

13. The method of claim 10, wherein the loop closure electronics includes at least one digital-to-analog converter that converts digital samples into the electronic signal, wherein the digital filter is applied to the digital samples prior to the digital-to-analog converter and the analog filter is applied to the electronic signal after the digital-to-analog converter.

14. The method of claim 10, wherein the electronic signal includes a bias modulation signal and a feedback signal produced by the loop closure electronics.

15. The method of claim 14, wherein the loop closure electronics further inserts random step signals or other modulation waveform into the electronics signal.

16. A loop closure electronics apparatus for a fiber optic gyroscope having an optical phase modulator characterized by a transfer function that includes an error component of at least second order, the apparatus comprising:
   a first digital circuit that generates a digital bias modulation signal;
   a second digital circuit that generates a digital feedback signal;
   at least one digital-to-analog converter that produces an electrical signal that drives the phase modulator from the digital bias modulation signal and the digital feedback signal;
   a compensator that includes an analog filter of at least second order and a digital filter of at least second order, wherein the analog filter and the digital filter pre-filter the electrical signal to compensate for the error component.

17. The apparatus of claim 16, wherein the digital filter is applied to the digital bias modulation signal and the digital feedback signal prior to the at least one digital-to-analog converter and the analog filter is applied to the electronic signal after the digital-to-analog converter.

18. The apparatus of claim 16, wherein at least two poles of the analog filter are placed to compensate for two zeros of the error component and at least two zeros of the analog filter are placed to compensate for two poles of the error component; and
   wherein at least two poles of the digital filter are placed to fine tune the at least two poles of the analog filter and at least two zeros of the digital filter are placed to fine tune the at least two zeros of the analog filter.

19. The apparatus of claim 16, wherein the optical phase modulator comprises a waveguide of titanium in-diffused Lithium Niobate material.

20. The apparatus of claim 16, the apparatus further comprising:
   a third digital circuit that inserts random step signals into the electronics signal prior to the analog filter and digital filter.

* * * * *